United States Patent
Jang et al.

(10) Patent No.: US 9,218,249 B2
(45) Date of Patent: Dec. 22, 2015

(54) ELECTRONIC APPARATUS, METHOD OF RESTORING GUID PARTITION TABLE (GPT) AND COMPUTER-READABLE RECORDING MEDIUM

(71) Applicant: SAMSUNG Electronics Co., Ltd., Suwon-si, Gyeonggi-do (KR)

(72) Inventors: Min Jang, Suwon-si (KR); Jae-hwan Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 153 days.

(21) Appl. No.: 14/032,265

(22) Filed: Sep. 20, 2013

(65) Prior Publication Data

US 2014/0089653 A1    Mar. 27, 2014

(30) Foreign Application Priority Data

Sep. 24, 2012   (KR) .................. 10-2012-0105960

(51) Int. Cl.
*G06F 11/00* (2006.01)
*G06F 11/14* (2006.01)
*G06F 11/10* (2006.01)

(52) U.S. Cl.
CPC ........ *G06F 11/1417* (2013.01); *G06F 11/1096* (2013.01); *G06F 11/1435* (2013.01)

(58) Field of Classification Search
CPC ..................... G06F 11/1417; G06F 11/1096
See application file for complete search history.

(56) References Cited

U.S. PATENT DOCUMENTS

| | | | |
|---|---|---|---|
| 2004/0255106 A1* | 12/2004 | Rothman et al. | 713/1 |
| 2006/0200626 A1* | 9/2006 | Gabryjelski | 711/114 |
| 2014/0059293 A1* | 2/2014 | Bisht | 711/113 |

* cited by examiner

*Primary Examiner* — Charles Ehne
(74) *Attorney, Agent, or Firm* — Staas & Halsey LLP

(57) ABSTRACT

An electronic apparatus comprising a storage unit to store a first (primary) GPT, a second (secondary) GPT, and an OS, a controller boots the electronic apparatus using the first GPT and the OS, an effectiveness determination unit determines effectiveness of the first GPT if a predetermined event occurs, and a restoration unit restores the first GPT using the second GPT if the first GPT is not effective.

18 Claims, 9 Drawing Sheets

ELECTRONIC APPARATUS, METHOD OF RESTORING GUID PARTITION TABLE (GPT) AND COMPUTER-READABLE RECORDING MEDIUM

CROSS-REFERENCE TO RELATED APPLICATIONS

This application claims priority from Korean Patent Application No. 10-2012-0105960, filed on Sep. 24, 2012, in the Korean Intellectual Property Office, the disclosure of which is incorporated herein by reference in its entirety.

BACKGROUND OF THE INVENTION

1. Field of the Invention

Methods and apparatuses consistent with exemplary embodiments of the present general inventive concept relate to an electronic apparatus, a method of restoring a globally unique identifier (GUID) partition table (GPT), and a computer-readable recording medium, and more particularly, to an electronic apparatus which can restore a GPT damaged by a user's mistake, viruses, or system errors, a method to restore a GPT, and a computer-readable recording medium.

2. Description of the Related Art

As performance of modern computer systems has been improved, a high-capacity storage medium is used. Therefore, an operating system of the computer system is increasingly using a GPT rather than a master boot record (hereinafter, referred to as MBR). Specifically, there are only four partition entries in the MBR and a maximum size of a single partition of the MBR is 2 TB. However, there are 128 partition entries in the GPT and a maximum size of a single partition of the GPT is 18 EB (1 EB=1,048,576 TB) (theoretically, the GPT can support up to 8 ZB (1 ZB=1024 EB)).

If the computer system using such a GPT is turned on, the following booting operation is performed. First, the GPT, which is stored in a storage medium, is read out so that the computer system is normally operated, and a boot sector record of a partition in which an operating system (OS) is stored is read out based on the GPT.

However, if the GPT is damaged by a user's mistake, viruses, or system errors, it is impossible to boot the computer system. In this case, the user cannot use the computer system and has the inconvenience of having to reinstall the OS.

Therefore, there is a demand for a method to restore a GPT easily if the GPT is damaged.

SUMMARY OF THE INVENTION

One or more exemplary embodiments of the present general inventive concept may overcome the above disadvantages and other disadvantages not described above. However, it is understood that one or more exemplary embodiment are not required to overcome the disadvantages described above, and may not overcome any of the problems described above.

The present general inventive concept provides an electronic apparatus which can restore a GPT damaged by a user's mistake, viruses, or system errors, a method of restoring a GPT, and a computer-readable recording medium.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing an electronic apparatus including: a storage unit to store a first (primary) GPT, a second (secondary) GPT, and an OS; a controller to boot the electronic apparatus using the first GPT and the OS; an effectiveness determination unit to determine effectiveness of the first GPT if a predetermined event occurs; and a restoration unit to restore the first GPT using the second GPT if the first GPT is not effective.

The effectiveness determination unit may calculate a CRC checksum value for each of a header and an entry of the first GPT, and may determine effectiveness of the first GPT by comparing the calculated checksum value and a checksum value pre-stored in the header of the first GPT.

The effectiveness determination unit may determine effectiveness of the second GPT if the first GPT is not effective, and, if the second GPT is effective, the restoration unit may restore the first GPT by reconstituting the second GPT.

The effectiveness determination unit may calculate a CRC checksum value for each of a header and an entry of the second GPT, and may determine the effectiveness of the second GPT by comparing the calculated checksum value and a checksum value pre-stored in the header of the second GPT.

If the second GPT is effective, the restoration unit may replace an entry of the first GPT with an entry of the second GPT, may reconstitute backup GPT header information and a checksum value of a header of the second GPT, and may replace a header of the first GPT with the reconstituted header of the second GPT.

If the electronic apparatus is booted, the controller may generate backup data for the first GPT and store the backup data in the storage unit, and, if the first GPT is not effective, the effectiveness determination unit may determine whether an entry of the first GPT is identical to an entry of the backup data. If the entry of the first GPT is identical to the entry of the backup data, the restoration unit may restore a header of the first GPT using a header of the backup data.

If the first GPT is not effective and the entry of the first GPT is not identical to the entry of the backup data, the effectiveness determination unit may determine effectiveness of the second GPT, and, if the second GPT is effective, the restoration unit may restore the first GPT by reconstituting the second GPT.

If the second GPT is not effective, the restoration unit may restore the header and the entry of the first GPT using the header and the entry of the backup data.

The controller may store the backup data for the first GPT in the storage unit as one file.

The controller may store the backup data for the first GPT in a BIOS.

The storage unit may further store a MBR. If the electronic apparatus is booted, the controller may generate MBR backup data for the MBR and may store the MBR backup data in the storage unit, and the effectiveness determination unit may determine effectiveness of the MBR using the MBR backup data.

If the MBR is not effective, the restoration unit may restore the MBR using the MBR backup data.

The predetermined event may be at least one of start of the OS, end of the OS, restart of the OS, log off of a user, conversion to a power saving mode, and a command to write about the first GPT.

The effectiveness determination unit may be a BIOS or an EFI.

The foregoing and/or other features and utilities of the present general inventive concept may also be achieved by providing a method of restoring a GPT of an electronic apparatus, the method including: booting the electronic apparatus using pre-stored first GPT and OS; determining effectiveness of the first GPT if a predetermined event occurs; and if the first GPT is not effective, restoring the first GPT using a pre-stored second GPT.

The method may further include, if the first GPT is not effective, determining effectiveness of the second GPT, and the restoring may include, if the second GPT is effective, restoring the first GPT by reconstituting the second GPT.

The method may further include: if the electronic apparatus is booted, generating and storing backup data for the first GPT; and if the first GPT is not effective, determining whether an entry of the first GPT is identical to an entry of the backup data, and the restoring may include, if the entry of the first GPT is identical to the entry of the backup data, restoring a header of the first GPT using a header of the backup data.

The method may further include, if the first GPT is not effective and the entry of the first GPT is not identical to the entry of the backup data, determining effectiveness of the second GPT, and the restoring may include, if the second GPT is effective, restoring the first GPT by reconstituting the second GPT.

The method may further include: if the electronic apparatus is booted, generating and storing MBR backup data for an MBR; determining effectiveness of the MBR using the MBR backup data; and if the MBR is not effective, restoring the MBR using the MBR backup data.

The foregoing and/or other features and utilities of the present general inventive concept may also be achieved by providing a computer readable recording medium which includes a program for executing a method of restoring a GPT, the method including: booting an electronic apparatus using pre-stored first GPT and OS; determining effectiveness of the first GPT if a predetermined event occurs; and if the first GPT is not effective, restoring the first GPT using a pre-stored second GPT.

The foregoing and/or other features and utilities of the present general inventive concept may also be achieved by providing an electronic apparatus comprising: a storage unit to store backup data corresponding to data of a primary GPT when the primary GPT is effective; an effectiveness determination unit to determine effectiveness of the primary GPT after a predetermined event occurs; and a restoration unit to restore the primary GPT by restoring a header of the data of the primary GPT using a header of the backup data when the primary GPT is not effective.

The storage unit may include a plurality of logical block addresses of a GPT, and the header of the data of the primary GPT is in one of the plurality of logical block addresses.

The effectiveness determination unit may determine the effectiveness of the primary GPT by calculating a CRC checksum value for both the header and entry of the data of the primary GPT, and then comparing the calculated CRC checksum value and a checksum value pre-stored in the header of the data of the primary GPT.

If the primary GPT is determined to be not effective, the effectiveness determination unit may determine whether the header of the data of the primary GPT is effective by determining whether entry of the primary GPT is identical to entry of the backup data upon comparing the entry of the data of the primary GPT with the entry of the backup data on a byte basis.

The restoration unit may restore the primary GPT using a secondary GPT when entry of the primary GPT is not identical to entry of the backup data.

The primary GPT may be in a first region of a GPT storage structure and the secondary GPT may be in a second region of the GPT storage structure.

Before restoring the primary GPT, the effectiveness determination unit may determine effectiveness of the secondary GPT when the entry of the primary GPT is not identical to the entry of the backup data.

When the secondary GPT is effective, the primary GPT may be restored by replacing the entry of the primary GPT with entry of the secondary GPT, reconstituting backup GPT header information and a checksum value of a header of the secondary GPT, and replacing a header of the primary GPT with a reconstituted header of the secondary GPT.

When the secondary GPT is not effective, the primary GPT may be restored by overwriting a header of the primary GPT with a header of the backup data and overwriting the entry of the primary GPT with the entry of the backup data.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
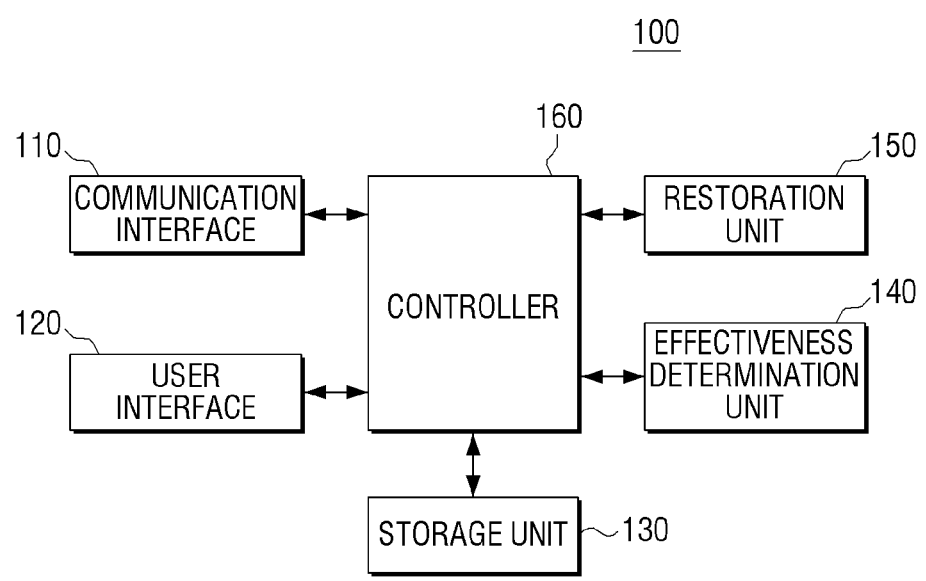
FIG. 1 is a block diagram illustrating an electronic apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of exemplary embodiments of the present general inventive concept. Thus, it is apparent that exemplary embodiments of the present general inventive concept can be carried out without those specifically defined matters. Also, functions or elements known in the related art are not described in detail since they would obscure the exemplary embodiments of the present general inventive concept with unnecessary detail.

FIG. 1 is a block diagram illustrating an electronic apparatus according to an exemplary embodiment of the present general inventive concept.

Referring to FIG. 1, an electronic apparatus 100 according to an exemplary embodiment includes a communication interface 110, a user interface 120, a storage unit 130, an effectiveness determination unit 140, a restoration unit 150, and a controller 160. The electronic apparatus 100 may be a personal computer (PC), a note book computer, a tablet PC, a portable multimedia player (PMP), or a mobile phone, etc., which is booted using a GPT.

The communication interface 110 is configured to connect the electronic apparatus 100 to an external apparatus (not shown), and may access the external apparatus through a local area network (LAN) and the internet, or may access the external apparatus in a wireless communication method (for example, through a wireless communication network such as GSM, UMTS, LTE, CDMA, or WiBRO, etc.).

The user interface 120 may include a plurality of function keys through which a user sets or selects various functions supported by the electronic apparatus 100, and may display a variety of information provided by the electronic apparatus 100. The user interface 120 may be implemented by a device which performs input and output simultaneously such as a touch screen, or may be implemented by a device combining a mouse and a monitor, or may be implemented by combining a microphone and voice recognition technology.

The storage unit 130 stores a program to drive the electronic apparatus 100. Specifically, the storage unit 130 may store a program which is a set of commands necessary to drive the electronic apparatus 100. The program recited herein includes a GUID partition table (GPT) and an operating system (OS). Specifically, the OS is an operating program to drive the electronic apparatus 100, and the GPT is information to identify where and how the OS is located when the electronic apparatus 100 is being booted, and to allow the OS to be loaded into a main memory device of a computer. A detailed structure of the GPT will be explained with reference to FIG. 2.

The storage unit 130 stores backup data of a first (primary) GPT and MBR backup data, which is backup data of an MBR. In practice, the backup data of the first GPT and the MBR backup data may be stored in a separate basic input/output system (BIOS) rather than in a storage medium in which the first GPT is stored.

The effectiveness determination unit 140 determines effectiveness of the first GPT when a predetermined event occurs. Specifically, the effectiveness determination unit 140 may determine whether the first GPT is effective or not when an event such as start of the OS, end of the OS, restart of the OS, log off of a user, conversion to a power saving mode, and a command to write about the GPT occurs.

First, the effectiveness determination unit 140 may determine the effectiveness of the MBR by comparing the MBR and the MBR backup data. Specifically, as will be explained below with reference to FIG. 3, the MBR is located in a first sector of a disk even in the GPT for the sake of compatibility of the system. However, the MBR in the GPT does not store information on the partition in which the OS is stored, and stores information indicating that the corresponding disk is an apparatus for supporting the GPT on a first partition table region and a reserved region. Accordingly, the effectiveness determination unit 140 determines effectiveness of the MBR by comparing a first partition table region and a reserved region of the MBR and a first partition table region and a reserved region of the MBR backup data.

Although only the first partition table region and the reserved region of the MBR are compared in the aforesaid exemplary embodiment of the present general inventive concept, the present general inventive concept is not limited thereto. For example, the effectiveness of the MBR may also be determined by comparing the whole region of the MBR and the whole region of the MBR backup data.

The effectiveness determination unit 140 may determine effectiveness of the first GPT.

Specifically, the effectiveness determination unit 140 calculates a cyclic redundancy check (CRC) checksum value for each of a header and an entry of the first GPT, and determines the effectiveness of the first GPT by comparing the calculated CRC checksum value and a checksum value pre-stored in the header of the first GPT.

If the calculated CRC checksum value is identical to the checksum value pre-stored in the header of the first GPT, the effectiveness determination unit 140 determines that the first GPT is effective. On the other hand, if the calculated CRC checksum value is not identical to the checksum value pre-stored in the header of the first GPT, the effectiveness determination unit 140 determines that the first GPT is not effective.

A GPT system stores information on a partition using two GPTs. A first GPT is a region that stores a GPT header and a GPT entry, which are used in a booting process, and a second (secondary) GPT is a backup region of the first GPT. Therefore, if the first GPT is not effective, the second GPT may be used to restore the first GPT. However, since the second GPT may also be damaged by a user's mistake, viruses, or system errors, the effectiveness determination unit 140 may determine the effectiveness of the second GPT if the first GPT is not effective.

Specifically, the effectiveness determination unit 140 calculates a CRC checksum value for each of a header and an entry of the second GPT, and determines effectiveness of the second GPT by comparing the calculated CRC checksum value and a checksum value pre-stored in the header of the second GPT. If the calculated CRC checksum value is identical to the checksum value pre-stored in the header of the second GPT, the effectiveness determination unit 140 determines that the second GPT is effective. On the other hand, if the calculated CRC checksum value is not identical to the checksum value pre-stored in the header of the second GPT, the effectiveness determination unit 140 determines that the second GPT is not effective.

Since backup data for the first GPT is generated at a time when the electronic apparatus 100 is normally booted, the backup data may be used if the first GPT is damaged. Since the backup data is data that is backed up at the time when the first GPT is normally booted, that is, when effectiveness is recognized, a separate process of determining effectiveness of the backup data is not required. However, if the first GPT is not effective (or if the first GPT and the second GPT are not effective), the effectiveness determination unit 140 may determine effectiveness of the backup data for the sake of stability of the system. The method of determining the effectiveness of the backup data may be the same as the method of determining effectiveness of the first GPT or the second GPT, as described above.

The first GPT includes a header and an entry. Therefore, only the header, only the entry, or both the header and the entry may be damaged by a user's mistake, viruses, or system errors. If only the header of the first GPT is damaged, the first GPT may be easily restored by restoring only the header of the first GPT. Accordingly, the effectiveness determination unit 140 may determine effectiveness of the entry of the first GPT by comparing the entry of the first GPT and the entry of the second GPT. Specifically, if the first GPT is not effective, the effectiveness determination unit 140 may determine effectiveness of the entry of the first GPT by comparing the entry of the first GPT and the entry of the second GPT on a byte basis. If the entry of the first GPT is identical to the entry of the second GPT, the effectiveness determination unit 140 determines that the entry of the first GPT is effective. On the other hand, if the entry of the first GPT is not identical to the entry of the second GPT, the effectiveness determination unit 140 determines that the entry of the first GPT is not effective.

In the above exemplary embodiment of the present general inventive concept, the effectiveness of the entry of the first GPT is determined by comparing the entry of the first GPT and the entry of the second GPT. However, if there is backup data for the first GPT, the effectiveness of the entry of the first GPT may be determined by comparing the entry of the first GPT and an entry of the backup data. Specifically, if there is backup data for the first GPT and the first GPT is not effective, the effectiveness determination unit 140 may determine the effectiveness of the entry of the first GPT by comparing the entry of the first GPT and the entry of the backup data on the byte basis. At this time, if the entry of the first GPT is identical to the entry of the backup data, the effectiveness determination unit 140 determines that the entry of the first GPT is effective. On the other hand, if the entry of the first GPT is not identical to the entry of the backup data, the effectiveness determination unit 140 determines that the entry of the first GPT is not effective.

If the MBR is not effective, the restoration unit 150 restores the MBR using the MBR backup data which is stored in the storage unit 130. Specifically, if it is determined that the MBR is not effective, the restoration unit 150 restores the MBR by overwriting the MBR with the MBR backup data.

If the first GPT is not effective, the restoration unit 150 restores the first GPT using the second GPT or the backup data. Specifically, if the first GPT is not effective and the second GPT is effective, the restoration unit 150 may restore the first GPT by reconstituting the second GPT. More specifically, the restoration unit 150 may replace the entry of the first GPT with the entry of the second GPT, reconstitute backup GPT header information and a checksum value of a header of the second GPT, and replace the header of the first GPT with the reconstituted header of the second GPT. If the first GPT is not effective but the entry of the first GPT is effective, the restoration unit 150 may reconstitute the backup GPT header information and the checksum value of the header of the second GPT and replace only the header of the first GPT with the reconstituted header of the second GPT.

If there is backup data for the first GPT and the first GPT is not effective, the restoration unit 150 may replaces the entry of the first GPT with an entry of the backup data, and replaces the header of the first GPT with a header of the backup data. If the first GPT is not effective but the entry of the first GPT is effective, the restoration unit 150 may restore the first GPT by replacing only the header of the first GPT with the header of the backup data.

The controller 160 controls the elements of the electronic apparatus 100. Specifically, if the system is turned on, the controller 160 performs booting based on the first GPT and the OS, which are stored in the storage unit 130, and, if the electronic apparatus 100 is booted, the controller 160 generates backup data for the first GPT and MBR backup data, which is backup data for the MBR, and stores the backup data in the storage unit 130. At this time, the backup data may have a single file format. Although the controller 160 generates and stores the backup data in the exemplary embodiment of the present general inventive concept, the present general inventive concept is not limited thereto. For example, the backup data may be generated and stored by the effectiveness determination unit 140 or the restoration unit 150, described above. Also, although the generated backup data is stored in the storage unit 130 in the exemplary embodiment of the present general inventive concept described above, the present general inventive concept is not limited thereto. For example, the backup data may be stored in a BIOS of sector of hold in practice.

If an event occurs, such as start of the OS, end of the OS, restart of the OS, log off of a user, and conversion to a power saving mode, the controller 160 may control the effectiveness determination unit 140 to determine effectiveness of the current MBR and the first GPT. If the first GPT is effective, the controller 160 may perform an operation corresponding to the event.

If it is determined that the MBR and/or the first GPT is not effective, the controller 160 may control the restoration unit 150 to restore the MBR and/or the first GPT, and may perform an operation corresponding to the event after the MBR and/or the first GPT is restored.

According to the exemplary embodiment of the present general inventive concept described above, if the first GPT is not effective, the electronic apparatus 100 can restore the first GPT using the second GPT or the backup data.

Although the effectiveness determination unit 140 and the restoration unit 150 are illustrated as separate elements in FIG. 1, the present general inventive concept is not limited there. For example, the effectiveness determination unit 140 and the restoration unit 150 may be incorporated into one element in practice. If so, the corresponding element may be a BIOS or an extensible firmware interface (EFI).

Figure 2:
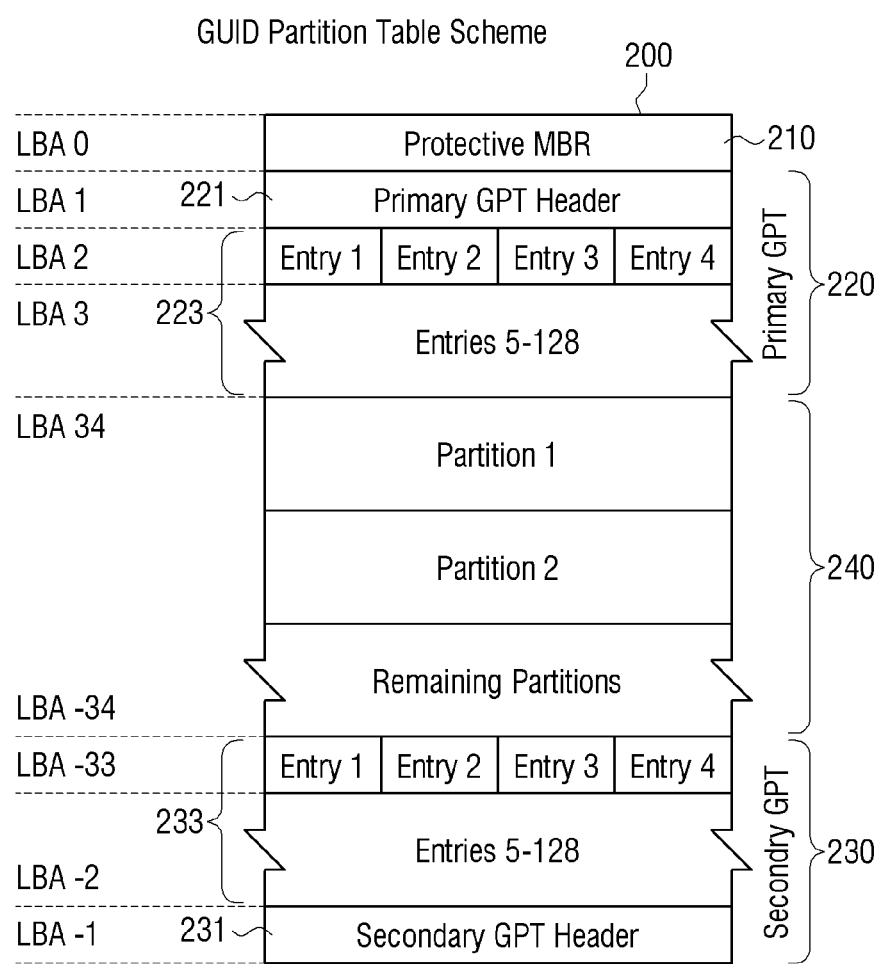
FIG. 2 is a view illustrating a storage structure of a storage unit according to an exemplary embodiment of the present general inventive concept.

FIG. 2 is a view illustrating a storage structure 200 of the storage unit 130 according to an exemplary embodiment of the present general inventive concept.

The storage unit 130 may include an MBR 210, a first GPT 220, a partition region 240, and a second GPT 230. In a GPT system, an address is divided by logical block addressing (LBA), and each LBA consists of 512 bytes.

The MBR 210 is located on a first sector of a storage medium (for example, a hard disk) as a region for compatibility with an apparatus that does not use an EFI system. Specifically, a related-art MBR is a region that stores information indicating where and how the OS is located, but, in an EFI system, such information is stored in the first GPT. Accordingly, the MBR of the EFI system includes only information indicating that a corresponding disk supports a GPT system. This will be explained in detail with reference to FIG. 3.

The first GPT 220 is a region that stores information indicating where and how the OS is located, and includes a first GPT header 221 and a first GPT entry 223.

The first GPT header 221 has a size of 92 bytes as a header of the first GPT 220, and has information of as signature, revision, header size, CRC 32 (a 33 bit CRC polynomial) of a header (a checksum value of a header), current LBA, backup LBA (address information of the second GPT), first usable LBA for partitions, last usable LBA, disk GUID, partition entries starting LBA, number of partition entries, size of a partition entry, and CRC 32 of partition array (a checksum value of an entry).

The first GPT entry 223 stores information on a partition and there are 128 entries having a size of 128 Kbyte. Each entry has information of partition type GUID, unique partition GUID, first LBA, last LBA, attribute flags, and partition name information. Such a GPT system supports the 128 entries and thus a corresponding disk may have 128 logical partitions.

The second GPT 230 is a backup file of the first GPT and is updated when the first GPT is changed. The second GPT 230 includes a second GPT header 231 and a second GPT entry 233.

The second GPT header 231 is a backup file of the first GPT header 221, and has a location of the first GPT header 221 in backup LBA and has its location in current LBA. This is a form in which values of the current LBA and the backup LBA of the first GPT header 221 are stored in reverse, and the first GPT header 221 regards the second GPT header 231 as a backup copy and the second GPT header 231 regards the first GPT header 221 as a backup copy. Accordingly, CRC 32 of the header value of the second GPT header 231 and CRC 32 of the header value of the first GPT header 221 are not identical to each other.

Considering the above, if the first GPT is restored using the second GPT, the restoration unit 150 replaces the value of the current LBA and the value of the backup LBA of the second GPT header 231 with each other, reconstitutes the second GPT header by calculating the CRC 32 value of the second GPT header by replacement, and overwrites the first GPT header with the reconstituted second GPT header.

The second GPT entry 233 stores information on the partition and has the same value as that of the first GPT entry 223. Accordingly, if the first GPT is restored using the second GPT, the restoration unit 150 restores the entry of the first GPT by overwriting the first entry of the first GPT with the second entry of the second GPT.

The partition 240 is where an actual partition exists and is a region that stores the OS and various programs.

Figure 3:
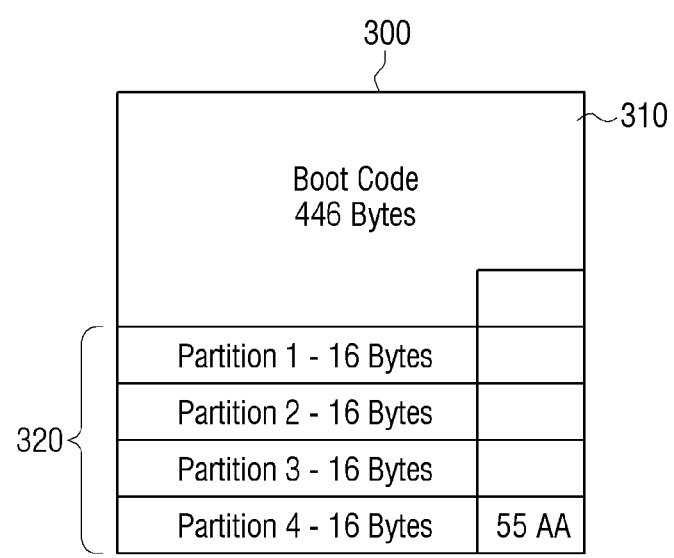
FIG. 3 is a view illustrating a structure of a MBR illustrated in FIG. 2.

FIG. 3 is a view illustrating the structure of the MBR of FIG. 2.

Referring to FIG. 3, an MBR 300 includes a boot code 310, a partition table region 320, and a reserved region 55AA. Such an MBR is located on a first sector of a storage medium and consists of 1 LBA, and generally has a size of 512 bytes.

In a GPT format, the MBR is located for the sake of compatibility with a system that does not support a GPT system, and does not include separate information in the boot code 310 and three partition table regions (partitions 2 to 4) of the partition table region 320. That is, the MBR includes information indicating that a corresponding disk supports the GPT system only in partition 1 and the reserved region 55AA.

Figure 4:
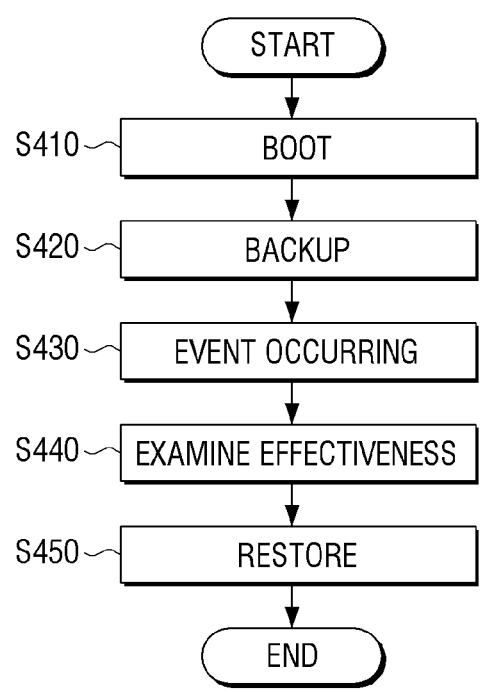
FIG. 4 is a flowchart illustrating a method of restoring a GPT according to an exemplary embodiment of the present general inventive concept.

FIG. 4 is a flowchart illustrating a method of restoring a GPT according to an exemplary embodiment of the present general inventive concept.

First, the electronic apparatus is booted using pre-stored GPT and OS (S410). Specifically, a booting operation is performed by reading out a first GPT which is stored in a storage medium and reading out a boot sector record of a partition (an active partition) in which the OS is stored based on the first GPT.

If the electronic apparatus is booted, backup data for the first GPT is generated and stored (S420). Specifically, if the electronic apparatus 100 is normally booted, backup data for the first GPT is generated at a time when the electronic apparatus 100 is booted and is stored. That is, since the first GPT, which is normally booted, is effective, the first GPT at the time when the electronic apparatus is booted may be stored as backup data.

If a predetermined event occurs (S430), effectiveness of the first GPT is determined (S440). Specifically, if an event occurs, such as end of the OS, restart of the OS, log off of a user, conversion to a power saving mode, or a command to write about the first GPT, it is determined whether the first GPT is effective or not. Also, effectiveness of the MBR may be determined, and, if the first GPT is not effective, it may be determined whether a second GPT is effective or not. According to a situation, effectiveness of the backup data for the first GPT may be determined, and, if the first GPT is not effective, it may be determined whether an entry of the first GPT is effective or not.

If the first GPT is not effective, the first GPT is restored (S450). Specifically, if the first GPT is not effective but the entry of the first GPT is effective, the entry of the first GPT is restored using the entry of the second GPT or the entry of the backup data, and, if the header of the first GPT or the header and the entry of the first GPT are not effective, the entry and the header of the first GPT may be restored using the entry and the header of the second GPT or the entry and the header of the backup data.

The method of restoring the GPT according to an exemplary embodiment of the present general inventive concept, as described above, can restore the first GPT using the second GPT or the backup data if the first GPT is not effective. Also, the method of restoring the GPT illustrated in FIG. 4 may be executed on the electronic apparatus having the configuration of FIG. 1, and may be executed on an electronic apparatus having other configurations.

Also, the method of restoring the GPT may be realized by a program including an algorithm executable in a computer, and the program may be stored in a non-transitory compute readable medium.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a CD, a DVD, a hard disk, a Blueray disk, a USB, a memory card, and a ROM, and may be provided.

Figure 5:
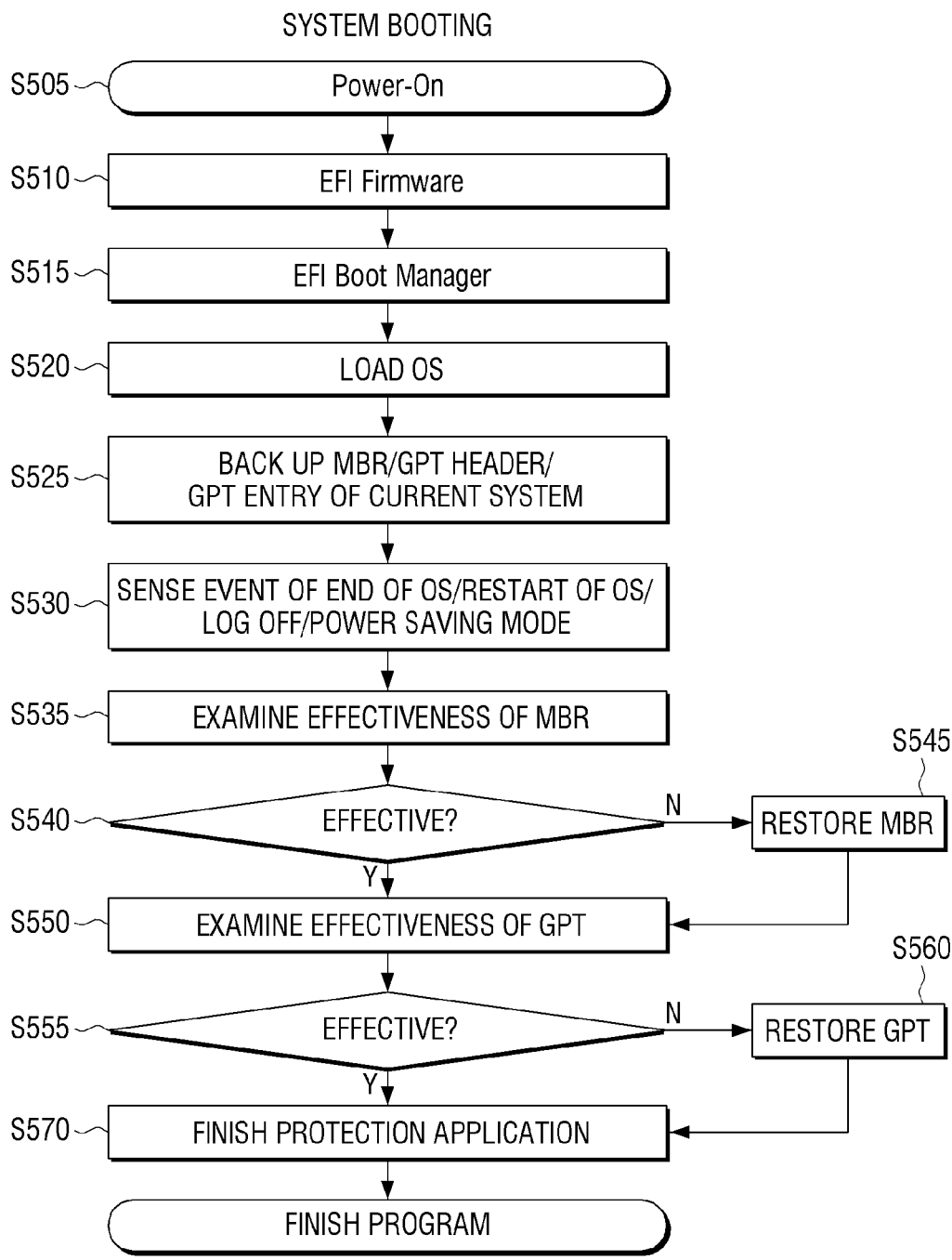
FIG. 5 is a flowchart illustrating the method of restoring the GPT of FIG. 4 in detail.

FIG. 5 is a flowchart illustrating the method of restoring the GPT of FIG. 4 in detail.

Referring to FIG. 5, if power is supplied to the electronic apparatus 100 (S505), an EFI firmware performs start-up routine (S510 and S515). The start-up routine is automatically executed when the electronic apparatus 100 is turned on, and performs a series of processes of examining a state of the electronic apparatus, initializing the system, and checking what peripheral is connected during the initializing process.

According to the start-up routine of the EFI, booting may be performed by reading out the OS according to partition information which is stored in the entry of the first GPT stored in a storage medium (S520).

If booting is performed, backup data for the first GPT and the MBR are generated (S525). Specifically, an application is executed to manage the GPT after the OS has been loaded, and the MBR region of 512 bytes, which is normally booted by the executed application, is backed up as a file. The header and the entry of the first GPT, which is normally booted, may be backed up as a file and may be stored in the storage medium. In the above example, the backup data is stored in the storage medium, but may be stored in a BIOS in practice.

After that, it is determined whether a predetermined event occurs or not (S530). Specifically, the MBR restoring operation aims at ensuring stability for next booting and may be performed when the OS is terminated (for example, end or restart of the OS, log off of a user, and conversion to a power saving mode). Therefore, the application may sense whether such an event occurs or not. Although the predetermined event indicates end of the OS in the above example, the effectiveness may be examined when a command to write about the first GPT is generated, that is, when the entry or header of the first GPT is modified. Also, the event may occur when the OS starts, that is, when the PC is turned on. This will be explained in detail with reference to FIG. 9.

If the predetermined event occurs, effectiveness of the MBR is determined first (S535). Specifically, the MBR is compared with pre-stored MBR backup data on the byte basis, and the effectiveness of the MBR is determined according to whether the MBR is identical to the MBR backup data. In practice, effectiveness of only the first partition table region and the reserved region of the MBR may be determined.

If the MBR is not effective (S540—N), the MBR may be restored using the MBR backup data (S545). Specifically, the MBR may be restored by overwriting the MBR with the MBR backup data.

If the MBR is effective (S540—Y) or the restoring of the MBR is completed, effectiveness of the first GPT is determined (S550). A detailed operation of determining the effectiveness of the first GPT will be explained below with reference to FIGS. 6 to 8.

If the first GPT is not effective (S555—N), the first GPT is restored (S560). A detailed operation of restoring will be explained below with reference to FIGS. 6 to 8.

If the GPT is effective (S555—Y) or the restoring of the first GPT is completed, an application for protecting the GPT is finished (S570) and an operation corresponding to the event is performed.

The method of restoring the GPT of FIG. 5 may be executed on the electronic apparatus having the configuration of FIG. 1, and may be executed on an electronic apparatus having other configurations. Also, operations S525 to S570 of the method of restoring the GPT may be performed by an application, and such an application may be stored on a computer readable recording medium. Although the above-described operation is executed by the application in the above example, the OS may perform the operation in practice.

Figure 6:
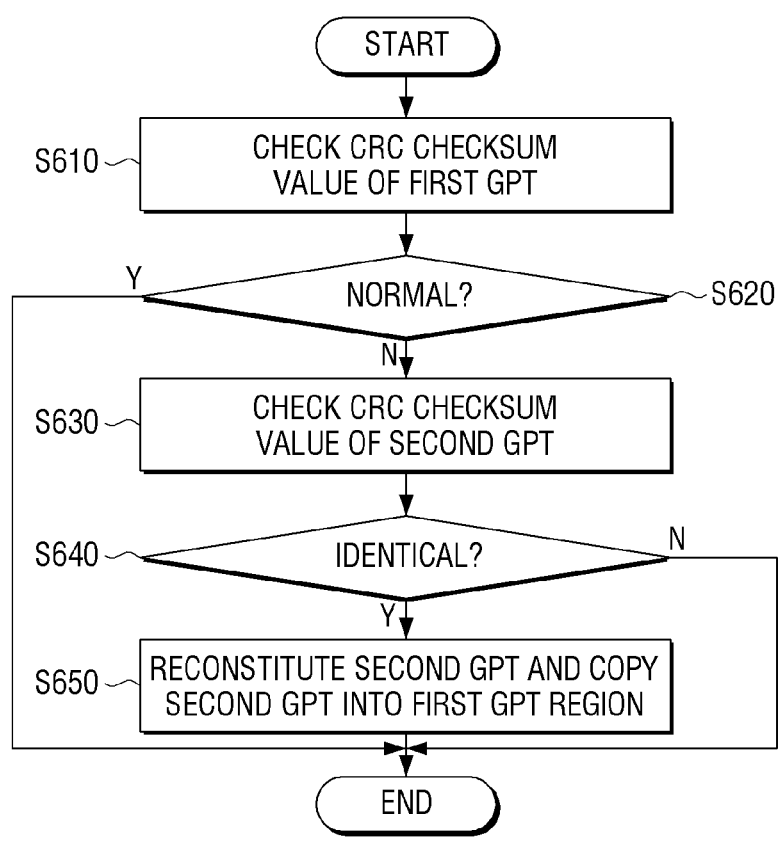
FIG. 6 is a flowchart illustrating an operation of determining effectiveness of a GPT and restoring the GPT according to a first exemplary embodiment of the present general inventive concept in detail.

FIG. 6 is a flowchart illustrating an operation of determining effectiveness of a GPT and restoring the GPT according to a first exemplary embodiment of the present general inventive concept. Specifically, the operation of determining the effectiveness of the GPT and restoring the GPT according to the first exemplary embodiment of the present general inventive concept uses only the second GPT.

First, effectiveness of the first GPT is determined (S610). Specifically, a CRC checksum value for each of a header and an entry of the first GPT is calculated, and the effectiveness of the first GPT is determined by comparing the calculated checksum value and a checksum value which is pre-stored in the header of the first GPT. If the first GPT is effective (S620—Y), an application for protecting the GPT is finished and an operation corresponding to the event is performed.

If the first GPT is not effective (S620—N), effectiveness of the second GPT is determined (S630). Specifically, a CRC checksum value for each of a header and an entry of the second GPT is calculated, and the effectiveness of the second GPT is determined by comparing the calculated checksum value and a checksum value which is pre-stored in the header of the second GPT.

If the second GPT is not effective (S640—N), the operation is finished without performing a separate restoring operation.

On other hand, if the second GPT is effective (S640—Y), the first GPT is restored by reconstituting the second GPT (S650). Specifically, the first GPT may be restored by replacing the entry of the first GPT with the entry of the second GPT, reconstituting backup GPT header information and a checksum value of the header of the second GPT, and replacing the header of the first GPT with the header of the second GPT.

Since the method of determining the effectiveness of the first GPT and restoring the first GPT according to the first exemplary embodiment of the present general inventive concept restores the first GPT using the second GPT, as described above, the first GPT can be easily restored without using separate backup data. Also, the method of determining the effectiveness of the first GPT and restoring the first GPT according to the first exemplary embodiment of the present general inventive concept may be realized by a program which includes an algorithm executable in a computer, and the program may be stored in a non-transitory computer readable medium and may be provided.

Although the first GPT is restored using the second GPT if the second GPT is effective in the above exemplary embodiment of the present general inventive concept illustrated in FIG. 6, in practice, it may be determined whether the entry of the first GPT is effective using the entry of the second GPT if the second GPT is effective, and, if the entry of the first GPT is effective, only the header of the first GPT may be restored. That is, if the second GPT is effective, it may be determined whether the entry of the first GPT is effective using the entry of the second GPT and, if it is determined that the first GPT is effective in this manner, only the header of the first GPT may be restored.

The second GPT may be a backup file of the first GPT and may be modified when the first GPT is modified. Therefore, hereinafter, an operation of restoring the first GPT using pre-generated backup data will be explained with reference to FIGS. 7 and 8.

Figure 7:
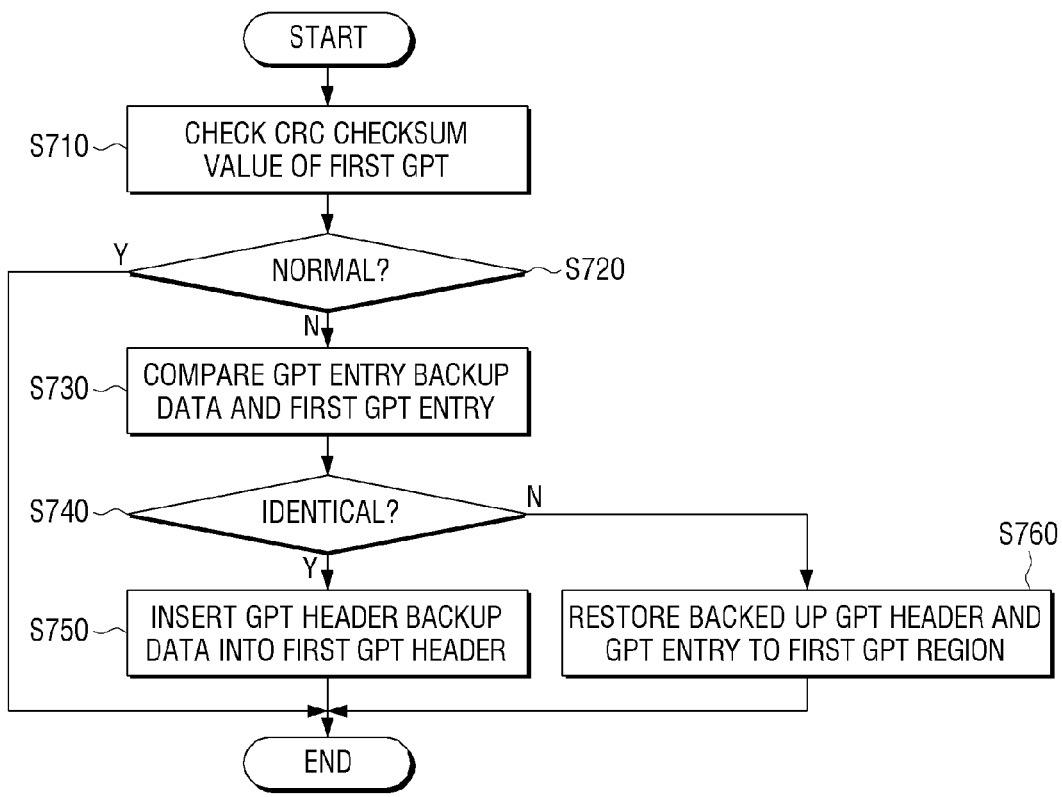
FIG. 7 is a flowchart illustrating an operation of determining effectiveness of a GPT and restoring the GPT according to a second exemplary embodiment of the present general inventive concept in detail.

FIG. 7 is a flowchart illustrating an operation of determining effectiveness of a GPT and restoring the GPT according to a second exemplary embodiment of the present general inventive concept. Specifically, the operation of determining the effectiveness of the first GPT and restoring the first GPT according to the second exemplary embodiment of the present general inventive concept uses backup data.

First, effectiveness of the first GPT is determined (S710). Specifically, a checksum value for each of a header and an entry of the first GPT is calculated, and the effectiveness of the first GPT is determined by comparing the calculated checksum value and a checksum value which is pre-stored in the header of the first GPT.

If the first GPT is effective (S720—Y), the operation is finished without performing a separate restoring operation.

On the other hand, if the first GPT is not effective (S720—N), it is determined whether the entry of the first GPT is identical to an entry of the backup data (S730). Specifically, in order to determine whether the entry of the first GPT is effective or not, it is determined whether the entry of the first GPT is identical to the entry of the backup data by comparing them on the byte basis.

If the entry of the first GPT is effective, that is, if the entry of the first GPT is identical to the entry of the backup data (S740—Y), the header of the first GPT is restored using the header of the backup data (S750). Specifically, the header of the first GPT may be restored by overwriting the header of the first GPT with the header of the backup data.

If the entry of the first GPT is not effective, that is, the entry of the first GPT is not identical to the entry of the backup data (S740—N), the header and the entry of the first GPT are restored using the backup data for the first GPT (S760). Specifically, the first GPT may be restored by overwriting the header of the first GPT with the header of the backup data and overwriting the entry of the first GPT with the entry of the backup data.

The method of determining the effectiveness of the first GPT and restoring the first GPT according to the second exemplary embodiment of the present general inventive concept restores the first GPT using the backup data generated when the electronic apparatus is effectively booted. The method of determining the effectiveness of the first GPT and restoring the first GPT according to the second exemplary embodiment of the present general inventive concept may be realized by a program which includes an algorithm executable in a computer, and the program may be stored in a non-transitory computer readable medium and may be provided.

In the above exemplary embodiment of the present general inventive concept, it is determined whether the entry of the first GPT is effective if the first GPT is not effective. However, in practice, if the first GPT is not effective, the header and the entry of the first GPT may be directly restored using the backup data without determining whether the entry of the first GPT is effective or not.

In FIGS. 6 and 7, the first GPT is restored using the second GPT or the backup data. However, according to embodiments of the present general inventive concept, the first GPT may be restored using both the second GPT and the backup data. This will be explained below with reference to FIG. 8.

Figure 8:
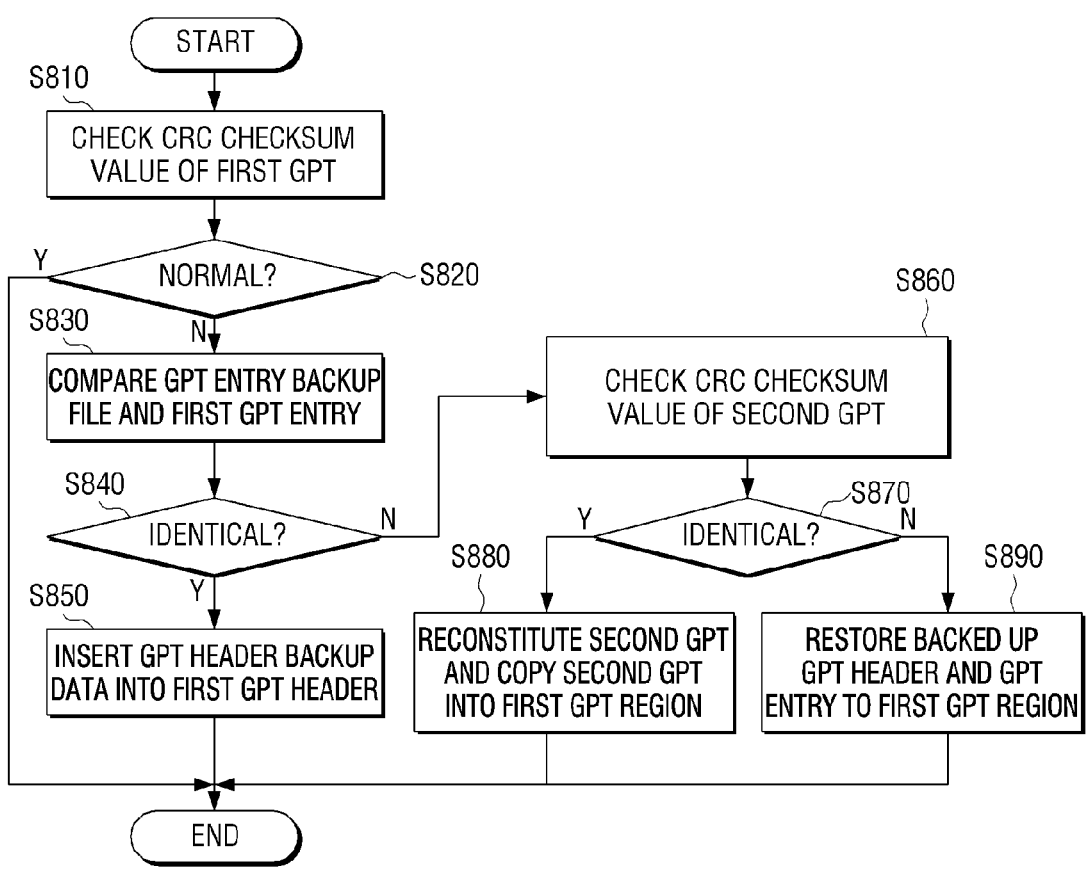
FIG. 8 is a flowchart illustrating an operation of determining effectiveness of a GPT and restoring the GPT according a first exemplary embodiment of the present general inventive concept in detail.

FIG. 8 is a flowchart illustrating an operation of determining effectiveness of a first GPT and restoring the first GPT according to a third exemplary embodiment of the present general inventive concept. Specifically, the operation of determining the effectiveness of the first GPT and restoring the first GPT according to the third exemplary embodiment of the present general inventive concept uses both the second GPT and the backup data.

First, effectiveness of the first GPT is determined (S810). Specifically, a checksum value for each of a header and an entry of the first GPT is calculated, and the effectiveness of the first GPT is determined by comparing the calculated checksum value and a checksum value which is pre-stored in the header of the first GPT.

If the first GPT is effective (S820—Y), the operation is finished without performing a separate restoring operation.

On the other hand, if the first GPT is not effective (S820—N), it is determined whether the entry of the first GPT and an entry of the backup data are identical to each other (S830). Specifically, in order to determine whether the entry of the first GPT is effective, it is determined whether the entry of the first GPT is identical to the entry of the backup data by comparing them on the byte basis.

If the entry of the first GPT is effective, that is, if the entry of the first GPT is identical to the entry of the backup data (S840—Y), the header of the first GPT is restored using the header of the backup data (S850). Specifically, the header of the first GPT may be restored by overwriting the header of the first GPT with the header of the backup data.

If the entry of the first GPT is not effective (S840—N), effectiveness of the second GPT is determined (S860). Specifically, a CRC checksum value for each of a header and an entry of the second GPT is calculated, and the effectiveness of the second GPT is determined by comparing the calculated checksum value and a checksum value which is pre-stored in the header of the second GPT.

If the second GPT is effective (S870—Y), the first GPT is restored by reconstituting the second GPT (S880). Specifically, the entry of the first GPT may be replaced with the entry of the second GPT, backup GPT header information and a checksum value of the header of the second GPT may be reconstituted, and the header of the first GPT may be replaced with the reconstituted header of the second GPT. In the above example, the first GPT is restored by reconstituting the second GPT without performing an additional operation. However, in practice, if the second GPT is effective, it may be determined whether the entry of the first GPT is effective or not by comparing the entry of the second GPT and the entry of the first GPT, and, if the entry of the first GPT is effective, only the header of the first GPT may be restored using the header of the second GPT.

If the second GPT is not effective (S870—N), the header and the entry of the first GPT are restored using the backup data for the first GPT (S890). Specifically, the first GPT may be restored by overwriting the header of the first GPT with the header of the backup data and overwriting the entry of the first GPT with the entry of the backup data.

The method of determining the effectiveness of the first GPT and restoring the first GPT according to the third exemplary embodiment of the present general inventive concept restores the first GPT using the backup data generated when the electronic apparatus is effectively booted. The method of determining the effectiveness of the first GPT and restoring the first GPT according to the third exemplary embodiment of the present general inventive concept may be realized by a program which includes an algorithm executable in a computer, and the program may be stored in a non-transitory computer readable medium and may be provided.

Figure 9:
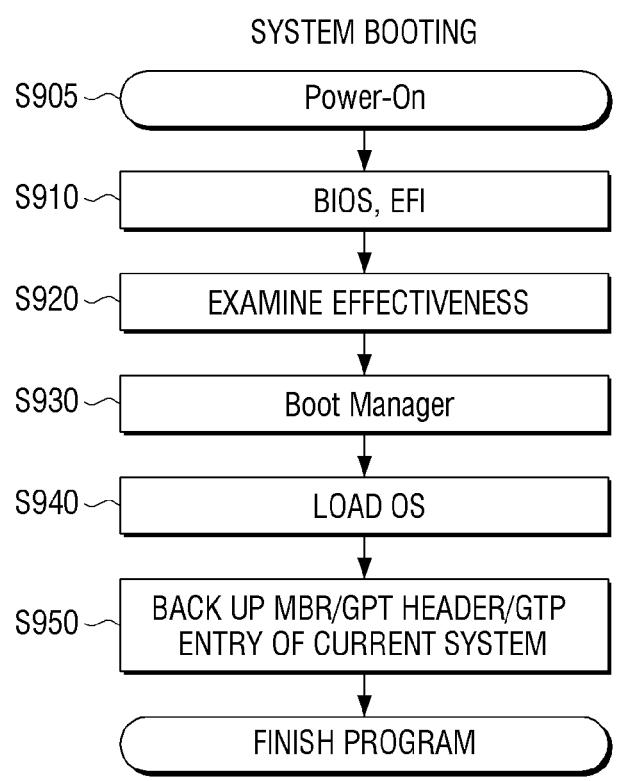
FIG. 9 is a flowchart illustrating a method of restoring a GPT according to an exemplary embodiment of the present general inventive concept.

FIG. 9 is a flowchart to illustrate a method of restoring a first GPT according to another exemplary embodiment of the present general inventive concept.

Referring to FIG. 9, if power is supplied to the electronic apparatus 100 (S905), an EFI firmware performs a routine to examine effectiveness of the first GPT (S910). The effectiveness examining routine refers to a routine that examines effectiveness of the first GPT prior to booting of the OS during the above-described start-up routine process.

The effectiveness of the first GPT is examined (S920). Specifically, the effectiveness of the first GPT may be examined using the method explained above with reference to FIGS. 6 to 8.

If the effectiveness of the first GPT is examined, a boot manager reads out the OS and performs booting (S920 and S930).

If the booting is performed, backup data for the first GPT and the MBR are generated and stored (S950). Specifically, an application to manage the first GPT is executed after the OS has been loaded, and the MBR region of 512 bytes, which is normally booted by the executed application, may be backed up as a file. The header and the entry of the first GPT, which is normally booted, may be backed up as a file and may be stored in the storage medium. In the above example, the backup data may be stored in the storage medium. However, the present general inventive concept is not limited thereto. For example, the backup data may be stored in a BIOS.

Therefore, the method to restore the first GPT according to another exemplary embodiment of the present general inventive concept examines the effectiveness of the first GPT and restores the first GPT while the system is being booted. Therefore, even if the user forcedly turns off the PC or the system is not normally terminated through a blue screen of death (BSOD), damaged information can be restored while the PC is being booted. The method to restore the GPT according to the method of FIG. 9 may be executed on the electronic apparatus having the configuration of FIG. 1, and may be executed on an electronic apparatus having other configurations. Also, operations S905 to S940 of the method to restore the first GPT may be realized by a program, and the program may be stored in a BIOS, an EFI or windows application.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
a storage unit to store a first (primary) GPT, a second (secondary) GPT, and an OS;
a controller to boot the electronic apparatus using the first GPT and the OS;
an effectiveness determination unit to determine effectiveness of the first GPT if a predetermined event occurs; and
a restoration unit to restore the first GPT using the second GPT if the first GPT is not effective,
wherein:
if the electronic apparatus is booted, the controller generates backup data for the first GPT and stores the backup data in the storage unit;
if the first GPT is not effective, the effectiveness determination unit determines whether an entry of the first GPT is identical to an entry of the backup data; and
if the entry of the first GPT is identical to the entry of the backup data, the restoration unit restores a header of the first GPT using a header of the backup data.

2. The electronic apparatus as claimed in claim 1, wherein the effectiveness determination unit calculates a CRC checksum value for each of a header and an entry of the first GPT, and determines effectiveness of the first GPT by comparing the calculated checksum value and a checksum value pre-stored in the header of the first GPT.

3. The electronic apparatus as claimed in claim 1, wherein:
the effectiveness determination unit determines effectiveness of the second GPT if the first GPT is not effective; and
if the second GPT is effective, the restoration unit restores the first GPT by reconstituting the second GPT.

4. The electronic apparatus as claimed in claim 3, wherein the effectiveness determination unit calculates a CRC checksum value for each of a header and an entry of the second GPT, and determines the effectiveness of the second GPT by comparing the calculated checksum value and a checksum value pre-stored in the header of the second GPT.

5. The electronic apparatus as claimed in claim 1, wherein:
if the first GPT is not effective and the entry of the first GPT is not identical to the entry of the backup data, the effectiveness determination unit determines effectiveness of the second GPT; and
if the second GPT is effective, the restoration unit restores the first GPT by reconstituting the second GPT.

6. The electronic apparatus as claimed in claim 5, wherein, if the second GPT is not effective, the restoration unit restores the header and the entry of the first GPT using the header and the entry of the backup data.

7. The electronic apparatus as claimed in claim 1, wherein the controller stores the backup data for the first GPT in the storage unit as one file.

8. The electronic apparatus as claimed in claim 1, wherein the controller stores the backup data for the first GPT in a BIOS.

9. The electronic apparatus as claimed in claim 1, wherein:
the storage unit further stores a MBR;
if the electronic apparatus is booted, the controller generates MBR backup data for the MBR and stores the MBR backup data in the storage unit; and
the effectiveness determination unit determines effectiveness of the MBR using the MBR backup data.

10. The electronic apparatus as claimed in claim 9, wherein, if the MBR is not effective, the restoration unit restores the MBR using the MBR backup data.

11. The electronic apparatus as claimed in claim 1, wherein the predetermined event is at least one of start of the OS, end of the OS, restart of the OS, log off of a user, conversion to a power saving mode, and a command to write about the first GPT.

12. The electronic apparatus as claimed in claim 1, wherein the effectiveness determination unit is a BIOS or an EFI.

13. An electronic apparatus comprising:
a storage unit to store a first (primary) GPT, a second (secondary) GPT, and an OS;
a controller to boot the electronic apparatus using the first GPT and the OS;
an effectiveness determination unit to determine effectiveness of the first GPT if a predetermined event occurs; and
a restoration unit to restore the first GPT using the second GPT if the first GPT is not effective,
wherein:
the effectiveness determination unit determines effectiveness of the second GPT if the first GPT is not effective; and
if the second GPT is effective, the restoration unit restores the first GPT by reconstituting the second GPT,
wherein, if the second GPT is effective, the restoration unit replaces an entry of the first GPT with an entry of the second GPT, reconstitutes backup GPT header information and a checksum value of a header of the second GPT, and replaces a header of the first GPT with the reconstituted header of the second GPT.

14. A method of restoring a GPT of an electronic apparatus, the method comprising:
booting the electronic apparatus using pre-stored first GPT and OS;
determining effectiveness of the first GPT if a predetermined event occurs; and
if the first GPT is not effective, restoring the first GPT using a pre-stored second GPT, further comprising:

if the electronic apparatus is booted, generating and storing backup data for the first GPT; and if the first GPT is not effective, determining whether an entry of the first GPT is identical to an entry of the backup data, wherein the restoring comprises, if the entry of the first GPT is identical to the entry of the backup data, restoring a header of the first GPT using a header of the backup data.

15. The method as claimed in claim 14, further comprising:

if the first GPT is not effective, determining effectiveness of the second GPT, wherein the restoring comprises, if the second GPT is effective, restoring the first GPT by reconstituting the second GPT.

16. The method as claimed in claim 14, further comprising:

if the first GPT is not effective and the entry of the first GPT is not identical to the entry of the backup data, determining effectiveness of the second GPT, wherein the restoring comprises, if the second GPT is effective, restoring the first GPT by reconstituting the second GPT.

17. The method as claimed in claim 14, further comprising:

if the electronic apparatus is booted, generating and storing MBR backup data for an MBR;

determining effectiveness of the MBR using the MBR backup data; and if the MBR is not effective, restoring the MBR using the MBR backup data.

18. A non-transitory computer readable recording medium comprising a program to execute the method of claim 14 of restoring a GPT, the method comprising:

booting an electronic apparatus using pre-stored first GPT and OS;

determining effectiveness of the first GPT if a predetermined event occurs; and if the first GPT is not effective, restoring the first GPT using a pre-stored second GPT, wherein comprising:

if the electronic apparatus is booted, generating and storing backup data for the first GPT; and if the first GPT is not effective, determining whether an entry of the first GPT is identical to an entry of the backup data, and if the entry of the first GPT is identical to the entry of the backup data, restoring a header of the first GPT using a header of the backup data.

* * * * *